(12) United States Patent
Smith et al.

(10) Patent No.: US 12,721,328 B2
(45) Date of Patent: Sep. 1, 2026

(54) SYSTEMS AND METHODS OF CONTROLLING POSITION OF A TRAWL NET

(71) Applicant: Katchi Technologies Incorporated, Tusket (CA)

(72) Inventors: Kyle Peter Smith, Sambro Head (CA); Marc Eric d'Entremont, Tusket (CA); Mark Alan de Jonge, Halifax (CA)

(73) Assignee: Katchi Technologies Incorporated, Tusket (CA)

( * ) Notice: Subject to any disclaimer, the term of this patent is extended or adjusted under 35 U.S.C. 154(b) by 64 days.

(21) Appl. No.: 18/774,978

(22) Filed: Jul. 17, 2024

(65) Prior Publication Data

US 2026/0020546 A1 Jan. 22, 2026

(51) Int. Cl.
*A01K 73/02* (2006.01)
*A01K 73/04* (2006.01)

(52) U.S. Cl.
CPC ............ *A01K 73/025* (2013.01); *A01K 73/04* (2013.01)

(58) Field of Classification Search
CPC .............................. A01K 73/025; A01K 73/04
See application file for complete search history.

(56) References Cited

U.S. PATENT DOCUMENTS 9,119,383 B2 9/2015 Skjold-Larsen
2007/0089349 A1 4/2007 Skjold-Larsen
2015/0103631 A1 4/2015 Skjold-Larsen
2015/0272094 A1 10/2015 Pearlman
2022/0264855 A1* 8/2022 Hystad ................. G01V 1/3817
2023/0397584 A1* 12/2023 Fernandes ............. A01K 73/10

FOREIGN PATENT DOCUMENTS

CN 111820194 B 5/2022
JP S5937416 A 2/1984
KR 100311092 B1 9/2001
WO 2019235935 A1 12/2019

OTHER PUBLICATIONS

"International Search Report and The Written Opinion," PCT/CA2025/050981, mailed Sep. 18, 2025, pp. 1-12.

(Continued)

*Primary Examiner* — Calvin Cheung
(74) *Attorney, Agent, or Firm* — SMART & BIGGAR LP

(57) ABSTRACT

A method of controlling position of a trawl net is provided. The method may comprise: receiving, by a processor, a control input, wherein the control input comprises: (i) a selection of one of a plurality of position control modes, and (ii) a position control setpoint for the trawl net; receiving, by the processor, sensor data indicating a sensed position of the trawl net; generating, by the processor, a first trawl position control output based on the control input and the sensor data; determining, by the processor, a rate of change of bathymetry along a travel path of the trawl net; and in response to the rate of change of bathymetry meeting a threshold condition, generating a second trawl position control output by changing the one of the plurality of position control modes to another of the plurality of position control modes.

18 Claims, 6 Drawing Sheets

(56) References Cited

OTHER PUBLICATIONS

Net Monitoring System Simrad PI32 [online]. [retrieved on Sep. 15, 2023]. Retrieved from the Internet: <URL: https://www.kongsberg.com/maritime/products/commercial-fisheries/fisherycatch/>.

Automatic Trawl Winch Control system [online]. [retrieved on Sep. 15, 2023]. Retrieved from the Internet: <URL: https://www.naustmarine.com/winch-control-system-solutions/atw-trawl-winch-control>.

Lee, Chun-Woo et al., "Application of a fuzzy controller to depth control of a midwater trawl net", Fisheries Science 2000, vol. 66, pp. 858-862.

Yan, Zhao et al., "An Improved Backstepping-Based Controller for Three-Dimensional Trajectory Tracking of a Midwater Trawl System", Journal of Control Science and Engineering, vol. 2016, pp. 1-11.

Reite, Karl-Johan, "Modelling and control of trawl systems", Doctoral thesis. Norwegian University of Science and Technology. [online]. [retrieved on Sep. 16, 2023]. Retrieved from the Internet: <URL: https://ntnuopen.ntnu.no/ntnu-xmlui/handle/11250/237617>.

Trawlvue monitoring system [online]. [retrieved on Sep. 15, 2023]. Retrieved from the Internet: <URL: https://www.e-sonar.ca/trawlvue-system>.

* cited by examiner

SYSTEMS AND METHODS OF CONTROLLING POSITION OF A TRAWL NET

FIELD

This document relates to systems and methods of controlling position of a trawl net moveable along a travel path.

BACKGROUND

Trawling is a method of fishing that involves towing a trawl net through a body of water behind one or more vessels. Trawling can be categorised as bottom trawling, midwater trawling, and hybrid trawling based on the position of the trawl net with reference to the bottom of the body of water.

Bottom trawling involves towing the trawl net along or close to the bottom of the body of water. Bottom trawling can have a detrimental environmental impact because it can stir bottom sediments, damage associated ecosystems, increase fuel consumption (due to drag on the vessel towing the trawl net), leave behind abandoned or lost ghost gear, and reduce catch selectivity (resulting in higher amounts of bycatch).

Midwater trawling and hybrid trawling attempt to reduce the adverse environmental impact by avoiding bottom contact. However, bottom contract can occur during midwater trawling and hybrid trawling without accurate and reliable position control of the trawl net. Additionally, inaccurate position control can result in fish captured at non-targeted heights in the water column, which in turn can result in undesirable bycatch.

SUMMARY

The following summary is provided to introduce the reader to the more detailed discussion to follow. The summary is not intended to limit or define any claimed or as yet unclaimed invention. One or more inventions may reside in any combination or sub-combination of the elements or process steps disclosed in any part of this document including its claims and figures.

The disclosed systems and methods can provide semi-autonomous or autonomous position control of a trawl net. The semi-autonomous control can be based on, for example, a user-defined position control mode and a position control setpoint. In the autonomous mode, the position control mode and the position control setpoint may be autonomously determined (e.g., to target a fish species at a specific height in the water column). The disclosed systems and methods can automatically generate the control outputs for controlling vessel winches and/or sheaves to control the trawl net based on the position control mode and the position control setpoint. This can enable accurate position control, for example, during midwater trawling and hybrid trawling to avoid bottom contact and/or improve catch selectivity.

In some cases, a trawling vessel (e.g., bottom trawling, midwater trawling or hybrid trawling) may encounter a rapidly changing bathymetry. For example, the bathymetry may change rapidly due to an obstacle located on the seabed along a travel path of the trawl net. In response to the rapidly changing bathymetry, the disclosed systems and methods can automatically change the position control mode to a depth feed forward control mode. As described in further detail herein, this can enable the trawl net to adjust to the rapidly changing bathymetry and avoid bottom contact.

Avoiding bottom contact can reduce drag thereby improving fuel consumption, reduce ecosystem damage and/or reduce ghost gear issues. The disclosed systems and methods can thereby improve the efficiency of the trawling process and reduce the environmental cost associated with trawling.

By providing semi-autonomous/autonomous position control including automatic obstacle avoidance, the disclosed systems and methods can enable trawl fishing operations in areas previously unreachable due to their craggy bathymetry and can enable fishing around the clock for semi-pelagic species that are migratory in the water column.

The disclosed systems and methods can use sensor data indicating a sensed position (e.g., depth below water surface, altitude above bottom of the body of water) of the trawl net. In some cases, the frequency of the sensor data may be lower than a target frequency for generation of control outputs. In such cases, the disclosed systems and methods can augment the sensor data by generating predicted trawl net position data. For example, the predicted trawl net position data may include predicted trawl net layback data, predicted trawl net depth data, predicted bathymetric data and/or predicted trawl net altitude data. The predicted trawl net position data can be generated at a higher frequency compared with the sensor data. The augmented data can enable the disclosed systems and methods to improve the position control performance for the trawl net.

According to some aspects, a method of controlling position of a trawl net is provided. The method may comprise: receiving, by a processor, a control input, wherein the control input comprises: (i) a selection of one of a plurality of position control modes, and (ii) a position control setpoint for the trawl net; receiving, by the processor, sensor data indicating a sensed position of the trawl net; generating, by the processor, a first trawl position control output based on the control input and the sensor data; determining, by the processor, a rate of change of bathymetry along a travel path of the trawl net; and in response to the rate of change of bathymetry meeting a threshold condition, generating a second trawl position control output by: changing the one of the plurality of position control modes to another of the plurality of position control modes, wherein the other of the plurality of control modes is a depth feed forward control mode, and changing the position control set point to a depth setpoint based on bathymetry.

According to some aspects, a position control system for a trawl net movable along a travel path is provided. The system may comprise: a memory storing processor-executable instructions; and at least one processor communicatively coupled with the memory. The at least one processor may be configured by the instructions to collectively: receive a control input, wherein the control input comprises: (i) a selection of one of a plurality of position control modes, and (ii) a position control setpoint for the trawl net; receive sensor data indicating a sensed position of the trawl net; generate a first trawl position control output based on the control input and the sensor data; determine a rate of change of bathymetry along the travel path of the trawl net; and in response to the rate of change of bathymetry meeting a threshold condition, generate a second trawl position control output by: changing the one of the plurality of position control modes to another of the plurality of position control modes, wherein the other of the plurality of control modes is a depth feed forward control mode, and changing the position control set point to a depth setpoint based on bathymetry.

According to some aspects, a non-transitory computer-readable medium comprising instructions executable by a processor is provided. The instructions when executed may configure the processor to: receive a control input, wherein the control input comprises: (i) a selection of one of a plurality of position control modes, and (ii) a position control setpoint for the trawl net; receive sensor data indicating a sensed position of a trawl net; generate a first trawl position control output based on the control input and the sensor data; determine a rate of change of bathymetry along a travel path of the trawl net; and in response to the rate of change of bathymetry meeting a threshold condition, generate a second trawl position control output by: changing the one of the plurality of position control modes to another of the plurality of position control modes, wherein the other of the plurality of control modes is a depth feed forward control mode, and changing the position control set point to a depth setpoint based on bathymetry.

BRIEF DESCRIPTION OF THE DRAWINGS

The drawings included herewith are for illustrating various examples of articles, methods, and apparatuses of the present specification and are not intended to limit the scope of what is taught in any way. In the drawings.

DETAILED DESCRIPTION

Figure 1:
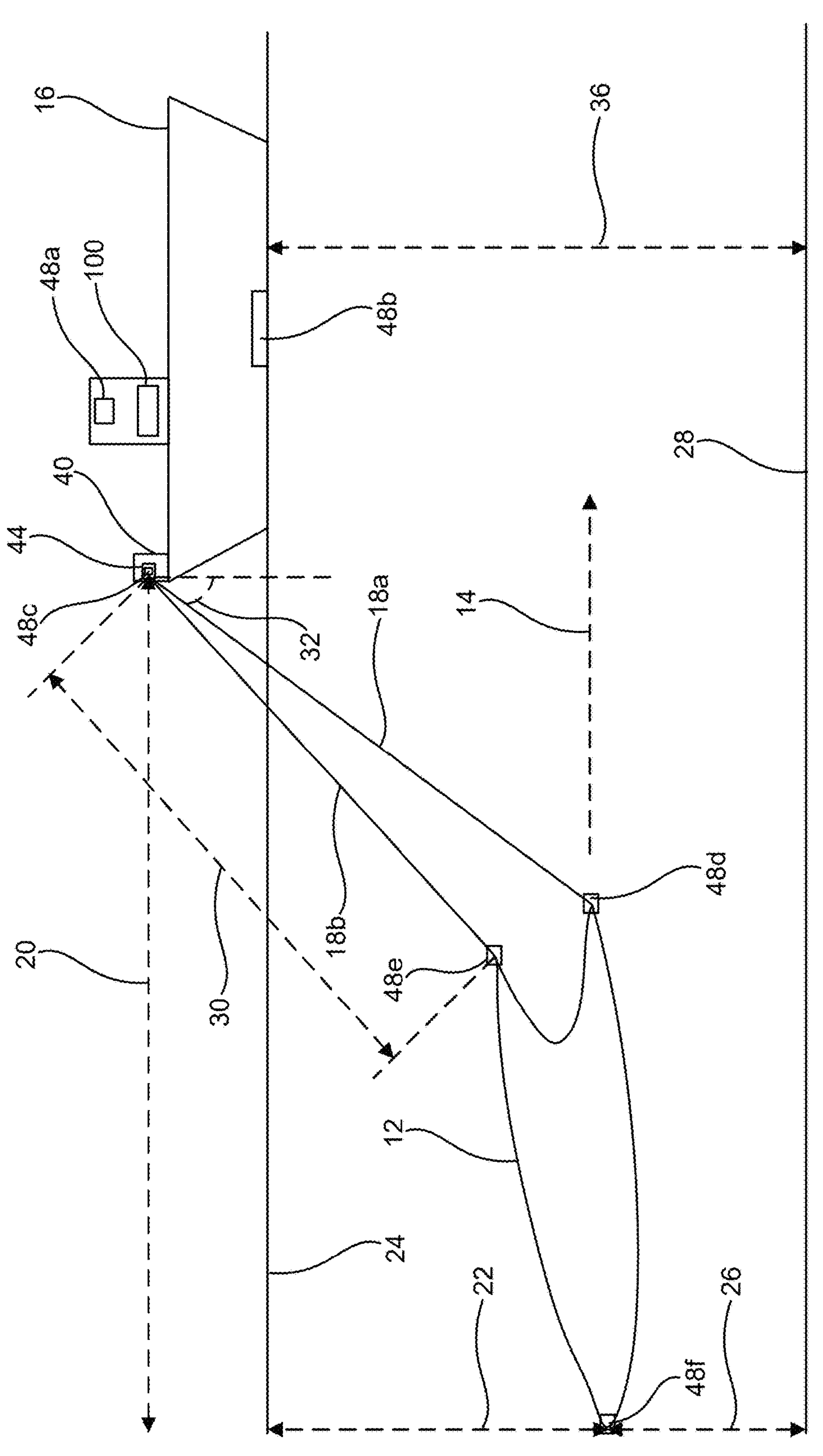
FIG. 1 is a schematic illustration of a position control system for a trawl net, in accordance with an embodiment.

Numerous embodiments are described in this application and are presented for illustrative purposes only. The described embodiments are not intended to be limiting in any sense. The invention is widely applicable to numerous embodiments, as is readily apparent from the disclosure herein. Those skilled in the art will recognize that the present invention may be practiced with modification and alteration without departing from the teachings disclosed herein. Although particular features of the present invention may be described with reference to one or more particular embodiments or figures, it should be understood that such features are not limited to usage in the one or more particular embodiments or figures with reference to which they are described.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

As used herein and in the claims, two or more parts are said to be "coupled", "connected", "attached", "joined", "affixed", or "fastened" where the parts are joined or operate together either directly or indirectly (i.e., through one or more intermediate parts), so long as a link occurs. As used herein and in the claims, two or more parts are said to be "directly coupled", "directly connected", "directly attached", "directly joined", "directly affixed", or "directly fastened" where the parts are connected in physical contact with each other. As used herein, two or more parts are said to be "rigidly coupled", "rigidly connected", "rigidly attached", "rigidly joined", "rigidly affixed", or "rigidly fastened" where the parts are coupled so as to move as one while maintaining a constant orientation relative to each other. None of the terms "coupled", "connected", "attached", "joined", "affixed", and "fastened" distinguish the manner in which two or more parts are joined together.

Further, although method steps may be described (in the disclosure and/or in the claims) in a sequential order, such methods may be configured to work in alternate orders. In other words, any sequence or order of steps that may be described does not necessarily indicate a requirement that the steps be performed in that order. The steps of methods described herein may be performed in any order that is practical. Further, some steps may be performed simultaneously.

As used herein and in the claims, a group of elements are said to 'collectively' perform an act where that act is performed by any one of the elements in the group, or performed cooperatively by two or more (or all) elements in the group.

As used herein and in the claims, a first element is said to be "received" in a second element where at least a portion of the first element is received in the second element unless specifically stated otherwise.

Some elements herein may be identified by a part number, which is composed of a base number followed by an alphabetical or subscript-numerical suffix (e.g., 112*a*, or $\mathbf{112}_1$). Multiple elements herein may be identified by part numbers that share a base number in common and that differ by their suffixes (e.g., $\mathbf{112}_1$, $\mathbf{112}_2$, and $\mathbf{112}_3$). All elements with a common base number may be referred to collectively or generically using the base number without a suffix (e.g., 112).

As used herein and in the claims, "up", "down", "above", "below", "upwardly", "vertical", "elevation", "upper", "lower" and similar terms are in reference to a directionality generally aligned with (e.g., parallel to) gravity. The terms "distal", "proximal" and similar terms are in reference to a directionality generally that is transverse (e.g., perpendicular) to gravity. However, none of the terms referred to in this paragraph imply any particular alignment between elements. For example, a first element may be said to be "vertically above" a second element, where the first element is at a higher elevation than the second element, and irrespective of whether the first element is vertically aligned with the second element.

Referring now to FIG. 1, shown therein is a schematic illustration of a position control system 100 in accordance with an embodiment. Position control system can control position of a trawl net 12 movable along a travel path 14 by a towing vessel 16. The position of trawl net 12 may be defined using one or more of a trawl net layback 20, a trawl net depth 22 below water surface 24 and/or a trawl net altitude 26 above bottom 28 of the water body.

Trawl net 12 may be towed by vessel 16 using any suitable number of tow lines. In the illustrated embodiment, trawl net 12 is towed using tow lines 18*a* and 18*b*. Vessel 16 may include any suitable number of winches 40 and sheaves 44 to tow trawl net 12. The number of winches 40 and sheaves 44 may correspond to the number of tow lines 18. For example, vessel 16 may include a starboard winch, a port side winch, a starboard sheave and a port side sheave.

One or more sensors 48 may generate sensor data associated with vessel 16 and/or trawl net 12. In the illustrated embodiment, sensors 48 includes a GPS sensor 48*a*, an echosounder 48*b*, sheave metering devices 48*c*, and trawl net sensors 48*d*-48*f*. GPS sensor 48*a* can generate sensor data indicating position of vessel 16. Echosounder 48*b* can generate sensor data indicating bathymetry 36. As used herein, "bathymetry" means underwater (e.g. ocean floor) topography, including depth of underwater terrain. Each sheave metering device 48*c* can generate sensor data indicating payout length of corresponding tow line 18 (for example, payout length 30 of tow line 18*b*). Any suitable design may be used to implement sheave metering device 48*c*. For example, sheave metering device 48*c* may be implemented using a rotary encoder. Trawl net sensors 48*d*-48*f* may generate sensor data indicating trawl net depth 22 and/or trawl net altitude 26. In other embodiments, sensors 48 may include other combinations of sensors, for example, different numbers and/or types of sensors.

Sensors 48 may include any suitable combination of custom-built and commercially available sensors. For example, all the sensors 48 may be custom-built sensors. In other examples, all the sensors 48 may be commercially available sensors. In some examples, sensors 48 may include some custom-built and some commercially available sensors. In some embodiments, the commercially available sensors may include the Trawlmaster Headline Height Sensor from NOTUS Electronics Ltd., the Trawlmaster Door Depth Sensor from NOTUS Electronics Ltd., the Marport™ High Definition Trawl Explorer Sensor, and/or the Marport™ Temp and Depth Sensors. In other embodiments, the commercially available sensors may include any other suitable sensors.

Figure 2:
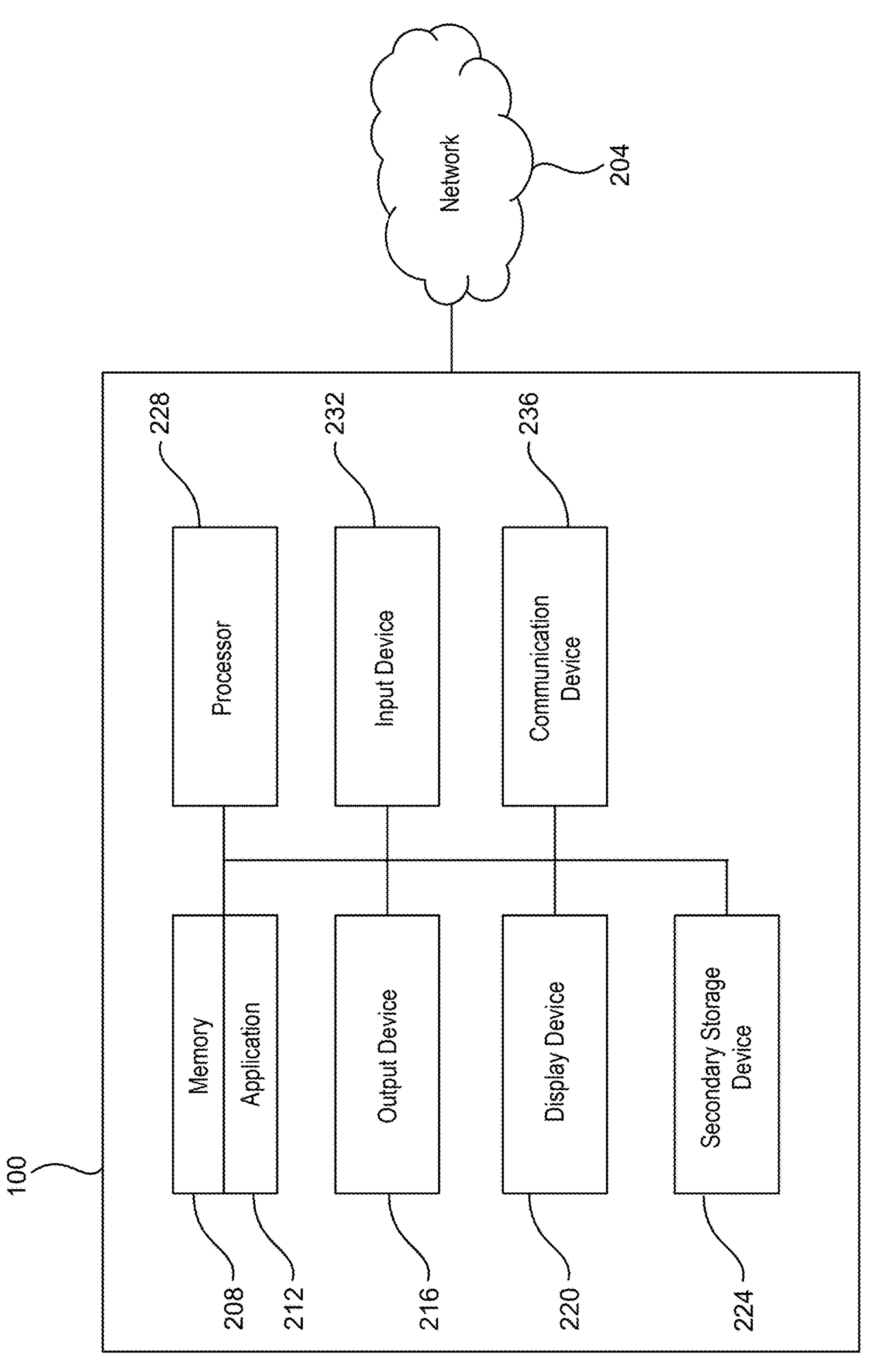
FIG. 2 is a block diagram of the position control system of FIG. 1.

Reference is now additionally made to FIG. 2. FIG. 2 shows a block diagram of position control system 100. Position control system 100 may be implemented using any suitable computing device, for example, a server, a workstation, a personal computer, a mobile computing device. In the illustrated embodiment, position control system 100 is located at vessel 16. In other embodiments, one or more (or all) components of position control system 100 may be located remote from vessel 16.

For the example embodiment illustrated in FIG. 2, position control system 100 includes a memory 208, an application 212, an output device 216, a display device 220, a secondary storage device 224, a processor 228, an input device 232, and a communication device 236. One or more (or all) of memory 208, application 212, output device 216, display device 220, secondary storage device 224, processor 228, input device 232, and communication device 236 may be communicatively coupled by wire and/or wirelessly.

In some embodiments, position control system 100 includes multiple of any one or more of memory 208, application 212, output device 216, display device 220, secondary storage device 224, processor 228, input device 232, and communication device 236. In some embodiments, position control system 100 does not include one or more of applications 212, secondary storage devices 224, network connections, input devices 232, output devices 216, display devices 220, and communication devices 236.

In at least one embodiment, position control system 100 includes a connection with a network 204 such as a wired or wireless connection to the Internet or to a private network. In some cases, network 204 includes other types of computer or telecommunication networks. Network 204 can enable position control system 100 to receive inputs and/or data including, for example, sensor data from sensors 48, user control inputs and setpoints, etc. Network 204 can enable position control system 100 to provide outputs and/or data including, for example, control outputs for controlling winches 40 and/or sheaves 44, user interface displays, etc.

Memory 208 can include one or more of random-access memory (RAM) and read-only memory (ROM). In some embodiments, memory 208 stores one or more applications 212 for execution by processor 228. Applications 212 correspond with software modules including computer executable instructions to perform processing for the functions and methods described herein. For example, application 212 include computer executable instructions that enable processor 228 to generate control outputs based on received control inputs and sensor data. The computer executable instruction may be implemented using any suitable software. In some embodiments, the software may include MathWorks' MATLAB/Simulink®, Python, C, C++.

In some embodiments, memory 208 may store one or more models to generate predicted trawl net position data based on input data including vessel data, sensor data and/or historical trawl net position data. The models may include any suitable models including, for example, machine learning models, statistical models, and/or deterministic models. The input data may include, for example, vessel speed data, vessel location data, chart data, sensor data indicating bathymetry, trawl net depth and/or altitude, payout length, historical trawl net position data including position control modes, position control setpoints and corresponding sensed trawl net position.

The machine learning models may be trained to generate predicted trawl net position data based on the input data. The machine learning models may be generated and trained by position control system 100. In some embodiments, position control system 100 may receive a generated machine learning model from an external device (e.g., over network 204) and may train the received machine learning model. In some embodiments, position control system 100 may receive a trained machine learning model from an external device (e.g., over network 204) and store the trained machine learning model in memory 208.

The machine learning model may be any suitable machine learning model based on the input data to be processed, the output data requirements, the available training data and/or available computing resources. Any suitable combination of ARIX/ARX/machine learning modelling practices may be used to generate and train the machine learning models.

The training data may include historical vessel data, sensor data and corresponding trawl net position data. In some embodiments, the machine learning models may be retrained, for example, using updated training data. The machine learning models may be retrained, for example, based on a periodic schedule, in response to a user input, or in response to an accuracy of the predicted trawl net position data falling below a threshold accuracy. In some embodiments, the machine learning models may be trained and/or retrained using training data specific to the controlled trawl net and/or vessel towing the trawl net. Different trawl net apparatus/vessels can have different physical properties and may respond differently to environmental conditions and and/or received trawl position control outputs. Additionally, different trawl net apparatus/vessels may include different combinations of components including winches, sensors, etc. The control performance may be improved by training the machine learning models using training data for the specific trawl net apparatus/vessel.

In some embodiments, memory 208 may store received control inputs and received sensor data in combination with corresponding trawl position control outputs generated by position control system 100. The stored data may be used for various application including, for example, generating user reports, analysing vessel performance, updating training data.

Secondary storage device 224 may include any suitable non-transitory computer-readable medium including instructions executable by a processor (e.g., processor 228).

For example, secondary storage device 224 can include a hard drive, floppy drive, CD drive, DVD drive, Blu-Ray™ drive, solid state drive, flash memory or other types of non-volatile data storage. Processor 228 may execute instructions included on secondary storage device 224 to perform processing for the functions and methods described herein.

In some embodiments, position control system 100 stores information in a remote storage device, such as cloud storage, accessible across a network, such as network 204 or another network. In some embodiments, position control system 100 stores information distributed across multiple storage devices, such as memory 208 and secondary storage device 224 (i.e., each of the multiple storage devices stores a portion of the information and collectively the multiple storage devices store all of the information). Accordingly, storing data on a storage device as used herein and in the claims, means storing that data in a local storage device, storing that data in a remote storage device, or storing that data distributed across multiple storage devices, each of which can be local or remote.

Input device 232 can include any device for entering information into position control system 100. For example, input device 232 can be a keyboard, keypad, cursor-device, touchscreen, camera, or microphone. Input device 232 can also include input ports and wireless radios (e.g., Bluetooth®, or 802.11x) for making wired and wireless connections to external devices.

Display device 220 can include any type of device for presenting visual information. For example, display device 220 can be a computer monitor, a flat-screen display, a projector or a display panel. Position control system 100 may use display device 220 to provide user interfaces to a user, for example, an input interface to receive control input from a user, an output interface to display trawl net position information to a user, etc.

Output device 216 can include any type of device for presenting a hard copy of information, such as a printer for example. Output device 216 can also include other types of output devices such as speakers, for example. In at least one embodiment, output device 216 includes one or more of output ports and wireless radios (e.g., Bluetooth®, or 802.11x) for making wired and wireless connections to external devices.

Communication device 236 can have any design suitable to receive analog and/or digital inputs from, and to provide analog and/or digital outputs. Communication device 236 can include, for example, one or more serial communication ports of a computing device (e.g., a laptop). In some embodiments, communication device 236 may include separate modules for analog and digital signals. Communication device 236 can enable position control system 100 to communicate with other devices including, for example, sensors 48, actuators for winches 40 and/or sheaves 44, external servers.

Processor 228 may be any device that can execute applications, computer readable instructions or programs. The applications, computer readable instructions or programs can be stored in memory 208 or in secondary storage device 224, or can be received from remote storage accessible through network 204, for example. Processor 228 may be a high-performance general processor, a standard processor (e.g., an Intel® processor or an AMD® processor), specialized hardware (e.g., microcontrollers, GPUs), or multiple processing devices that collectively perform the functions provided by processor 228.

Figure 3:
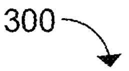
FIG. 3 is a flowchart illustrating an example method of controlling position of a trawl net.
Figure 3:
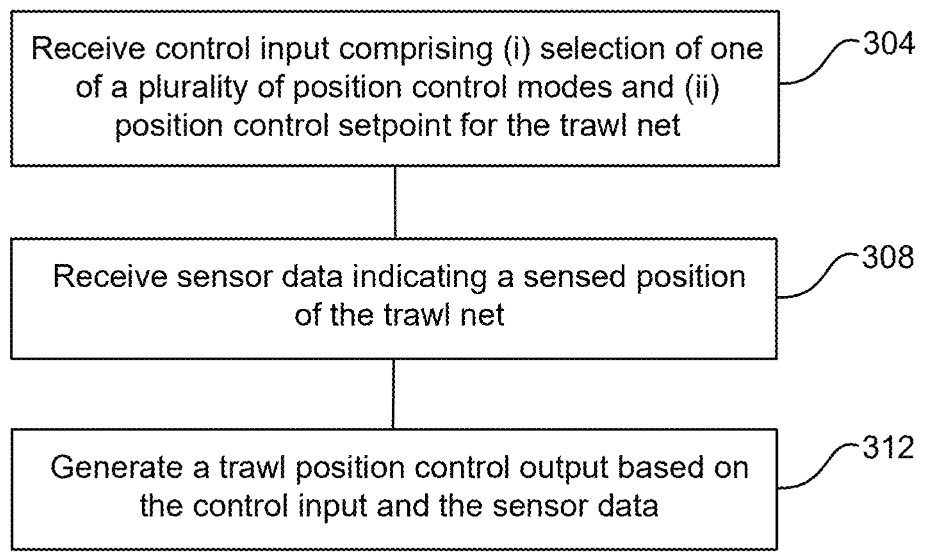

Referring now to FIG. 3, shown therein is a flowchart illustrating an example method 300 of controlling position of a trawl net. Method 300 may be performed, for example, using position control system 100 to control position of trawl net 12, and concurrent reference is made in the description below to FIGS. 1 and 2.

Method 300 may be executed for semi-autonomous or autonomous control of trawl net 12. Method 300 can enable position control of trawl net 12 during various trawling operations including, for example, midwater trawling or hybrid trawling.

At act 304, a processor may receive a control input that includes: (i) a selection of one of a plurality of position control modes, and (ii) a position control setpoint for the trawl net. For example, processor 228 of position control system 100 may receive a control input at act 304. In a semi-autonomous mode, the control input may be provided by a user. For example, an operator of vessel 16 may provide the control input using input device 232. In an autonomous mode, the control input may be provided by a control device. For example, control system 100 may autonomously generate the control input.

The plurality of position control modes may include any suitable number of position control modes. In some embodiments, the plurality of position control modes may include a payout control mode, a depth control mode, an altitude control mode, and a depth feed forward control mode.

The position control setpoint may be based on the selected control mode. For example, the control input may include a payout length setpoint corresponding to the payout control mode. As another example, the control input may include a trawl net depth setpoint corresponding to the depth control mode. As another example, the control input may include a trawl net altitude setpoint corresponding to the altitude control mode.

In other embodiments, the plurality of control modes may include additional or fewer control modes including additional control modes not described above. For example, the plurality of control modes may include a manual control mode to enable an operator to override position control system 100.

At act 308, the processor may receive sensor data indicating a sensed position of the trawl net. For example, processor 228 may receive the sensor data from sensors 48. In some cases, the sensor data may directly indicate a sensed position of the trawl net. For example, sensor data from trawl net sensors 48*d*-48*f* may directly indicate trawl net depth 22 and/or trawl net altitude 26. In some case, the processor may use the received sensor data to determine a position of the trawl net. For example, the processor may use received sensor data from GPS sensor 48*a*, echosounder 48*b*, and/or sheave metering device 48*c* to determine one or more of trawl net layback 20, trawl net depth 22 and trawl net altitude 26.

Sensors 48 may generate sensor data at any suitable frequency. In some embodiments, sensors 48 may generate the sensor data in a 0.1 Hz to 10 Hz range, i.e., a data point for the sensed parameter (e.g., bathymetry) is generated every 0.1 to 10 seconds. In other embodiments, sensor data may be generated at frequencies below 0.1 Hz or at frequencies greater than 10 Hz. Lower frequencies may reduce processing and communication bandwidth requirements. Higher frequencies may provide data with higher accuracy. In some embodiments, different sensors may generate sensor data at different frequencies.

Sensors 48 may use any suitable communication method to provide the generated sensor data to position control system 100. The communication method can include any suitable combination of communication media and communication protocols. The communication medium can include wired or wireless communication media. The communication protocols may include, for example, National Marine Electronics Association (NMEA) 0183, NMEA 2000, serial Recommended Standard (RS) 232/485/422, Transmission Control Protocol (TCP)/Internet Protocol (IP), Inter-Integrated Circuit (I2C) or Serial Peripheral Interface (SPI). For example, a wireless communication technique may be used to transfer data between sensors 48 and position control system 100. Sensors 48 may, for example, transmit data acoustically to a receiver integrated into position control system 100. In some examples, the receiver may be an independent unit that receives data acoustically from sensors 48 and transmits the received data to position control system 100 using any suitable communication method (e.g., using a NMEA 0183/NMEA 2000 communication protocol). In some embodiments, a wired connection may be used to transfer data between sensors 48 and position control system 100 (for example, a RS232 cable, a RS485 cable, etc.). Vessel 16 may include a data cable winch and a data cable sheave to control the data cable connecting trawl net sensors 48*d*-48*f* with position control system 100.

At act 312, the processor may generate a trawl position control output based on the control input and the sensor data. For example, processor 228 may generate the trawl position control output based on the control input received at act 304 and the sensor data received at act 308.

Processor 228 may implement any suitable controller to generate the trawl position control output. For example, processor 228 may implement an ON/OFF controller or a PID controller to generate the trawl position control output. In some embodiments, position control system 100 may include a dedicated controller (implemented in hardware and/or software) to generate the trawl position control outputs.

Position control system 100 may provide the generated trawl position control output to any suitable actuator. For example, the generated trawl position control output may be provided to solenoids that translate a received voltage signal into hydraulic action to actuate corresponding winches 40.

In some embodiments, processor 228 may generate the trawl position control output as a control output voltage signal based on a difference between a measured position value and the setpoint. For example, processor 228 may generate a control output voltage in a 0-5V range based on the difference between the measured position value and the setpoint. The control output voltage signal may be defined to use 0V-0.5V as a dead band, 0.5V-2.275V for pay-in (where 0.5 V is the highest speed for the winches), 2.275V-2.725V as another dead band, and 2.725V-4.5V for payout (where 4.5 V is the highest speed for the winches).

In some embodiments, a rate limiter may be used to accommodate the inertia associated with the trawl net apparatus (including the trawl net, the tow lines and the winches). Processor 228 may implement the rate limiter to limit the rate at which the control voltage is changed. For example, a rate limit of 1V/s may be used to avoid damage to the trawl net apparatus by attempting to change position too rapidly. In other examples, a different rate limit may be used based on factors including vessel speed, operating environment and properties (e.g., weight, material, etc.) associated with the trawl net apparatus.

In some embodiments, processor 228 may use a different control scheme to generate the trawl position control output. As one example, processor 228 may use a different voltage range for the generated control output voltage signal (e.g., 0 to 10V, −5V to 5V, etc.). As another example, processor 228 may use a current signal instead of a voltage signal as the trawl position control output. Each trawl position control output may have any suitable time duration. For example, the trawl position control output may have a time duration of multiple time periods for which a control signal is generated based on the selected position control mode, the position control setpoint and the received sensor data. The trawl position control output may include different control signals for different time periods. For example, different control signals may be generated during different time periods based on a difference between a measured position value corresponding to that time period and the position control setpoint. In some examples, the trawl position control output may have a time duration of a single time period for which a control signal is generated based on a selected position control mode, a position control setpoint and received sensor data. In the next time period, the processor may generate a different trawl position control output based on a different position control mode and/or different position control setpoint.

Position control system 100 may provide a display output (e.g., on display device 220) presenting the received control inputs, the received sensor data and/or the generated trawl position control outputs. For example, the display output may be provided to an operator of vessel 16 using any suitable user interface.

In some embodiments, position control system 100 may store the received control inputs and sensor data and the generated trawl position control outputs in a memory (e.g., memory 208, secondary storage device 224, or a remote server). The stored data may be used for various applications including, for example, troubleshooting problems, generating analysis reports, generating training data for machine learning models, etc.

As a first example of the implementation of method 300, the control input received at act 304 may include a payout control mode selection and an associated payout length setpoint. The sensor data received at act 308 may include data received from sheave metering device 48*c*. The received sensor data may include measured values of payout length 30 (e.g., in meters) of tow line 18. In some embodiments, the sensor data may further indicate a payout rate (e.g., in meters/second) of tow line 18.

At act 312, position control system 100 may generate the trawl position control output based on a difference between the measured value of payout length 30 and the payout length setpoint. For example, in response to the measured value of payout length being below the payout length setpoint, position control system 100 may generate a control output voltage to actuate the corresponding winch to payout additional tow line. As another example, in response to the measured value of payout length being above the payout length setpoint, position control system 100 may generate a control output voltage to actuate the corresponding winch to pay-in a portion of the tow line. The magnitude of the control output voltage may be proportional to the difference between the measured value of payout length and the payout length setpoint so that the winches are gradually slowed down as the measured value of payout length approaches the payout length setpoint.

In some embodiments, position control system 100 may implement a closed-loop control technique including one or more deadbands to minimize oscillation of the measured value around the setpoint. For example, a deadband may be defined around the payout length setpoint and in response to the measured value of payout length being within the deadband, position control system 100 may generate the control voltage output to maintain the current value of payout length. Further, if the difference between the measured value of payout length and the payout length setpoint is determined to be zero, a different larger deadband may be used to maintain the current value of payout length.

In some embodiments, position control system 100 may generate the trawl position control output to keep a starboard tow line payout value matched to a port side tow line payout value. For example, if the two tow line payout values are not matched, position control system 100 may generate the trawl position control output to actuate the corresponding winch to pay-in one of the two tow lines until the two tow lines are matched.

As a second example of the implementation of method 300, the control input received at act 304 may include a depth control mode selection and an associated trawl net depth setpoint. The sensor data received at act 308 may include measured values of trawl net depth 22. At act 312, position control system 100 may generate the trawl position control output based on a difference between the measured value of trawl net depth 22 and the trawl net depth setpoint. For example, in response to the measured value of trawl net depth 22 being greater than the trawl net depth setpoint, position control system 100 may generate a control output voltage to actuate the corresponding winch to pay-in a portion of the tow line. As another example, in response to the measured value of trawl net depth 22 being smaller than the trawl net depth setpoint, position control system 100 may generate a control output voltage to actuate the corresponding winch to payout additional tow line. The magnitude of the control output voltage may be proportional to the difference between the measured value of trawl net depth 22 and the trawl net depth setpoint so that the winches are gradually slowed down as the measured value of trawl net depth 22 approaches the trawl net depth setpoint.

As described herein above with reference to the payout control mode, in some embodiments, position control system 100 may generate the trawl position control output to keep the starboard and port side tow line payouts matched and/or may implement a closed-loop control technique including one or more deadbands to minimize oscillation of the measured value of trawl net depth 22 around the trawl net depth setpoint.

In some embodiments, position control system 100 may implement a PID controller to generate the trawl position control output. The "P" and "D" terms may be maintained as constants with values that are tuned for the specific tow net apparatus being controlled. The "I" term may be dynamic with values based on the difference between the measured value of trawl net depth 22 and the trawl net depth setpoint. This can minimize integral windup by reducing the contribution of the "I" term to the position control as the magnitude of the difference increases.

As a third example of the implementation of method 300, the control input received at act 304 may include an altitude control mode selection and an associated trawl net altitude setpoint. The sensor data received at act 308 may include measured values of trawl net altitude 26. At act 312, position control system 100 may generate the trawl position control output based on a difference between the measured value of trawl net altitude 26 and the trawl net altitude setpoint. For example, in response to the measured value of trawl net altitude 26 being greater than the trawl net altitude setpoint, position control system 100 may generate a control output voltage to actuate the corresponding winch to payout additional tow line. As another example, in response to the measured value of trawl net altitude 26 being smaller than the trawl net altitude setpoint, position control system 100 may generate a control output voltage to actuate the corresponding winch to pay-in a portion of the tow line. The magnitude of the control output voltage may be proportional to the difference between the measured value of trawl net altitude 26 and the trawl net altitude setpoint so that the winches are gradually slowed down as the measured value of trawl net altitude 26 approaches the trawl net altitude setpoint.

As described herein above with reference to the payout control mode, in some embodiments, position control system 100 may generate the trawl position control output to keep the starboard and port side tow line payouts matched and/or may implement a closed-loop control technique including one or more deadbands to minimize oscillation of the measured value of trawl net altitude 26 around the trawl net altitude setpoint.

In some embodiments, position control system 100 may implement a PID controller to generate the trawl position control output. The "P" and "D" terms may be maintained as constants with values that are tuned for the specific tow net apparatus being controlled. The "I" term may be dynamic with values based on the difference between the measured value of trawl net altitude 26 and the trawl net altitude setpoint. This can minimize integral windup by reducing the contribution of the "I" term to the position control as the magnitude of the difference increases.

Figure 4:
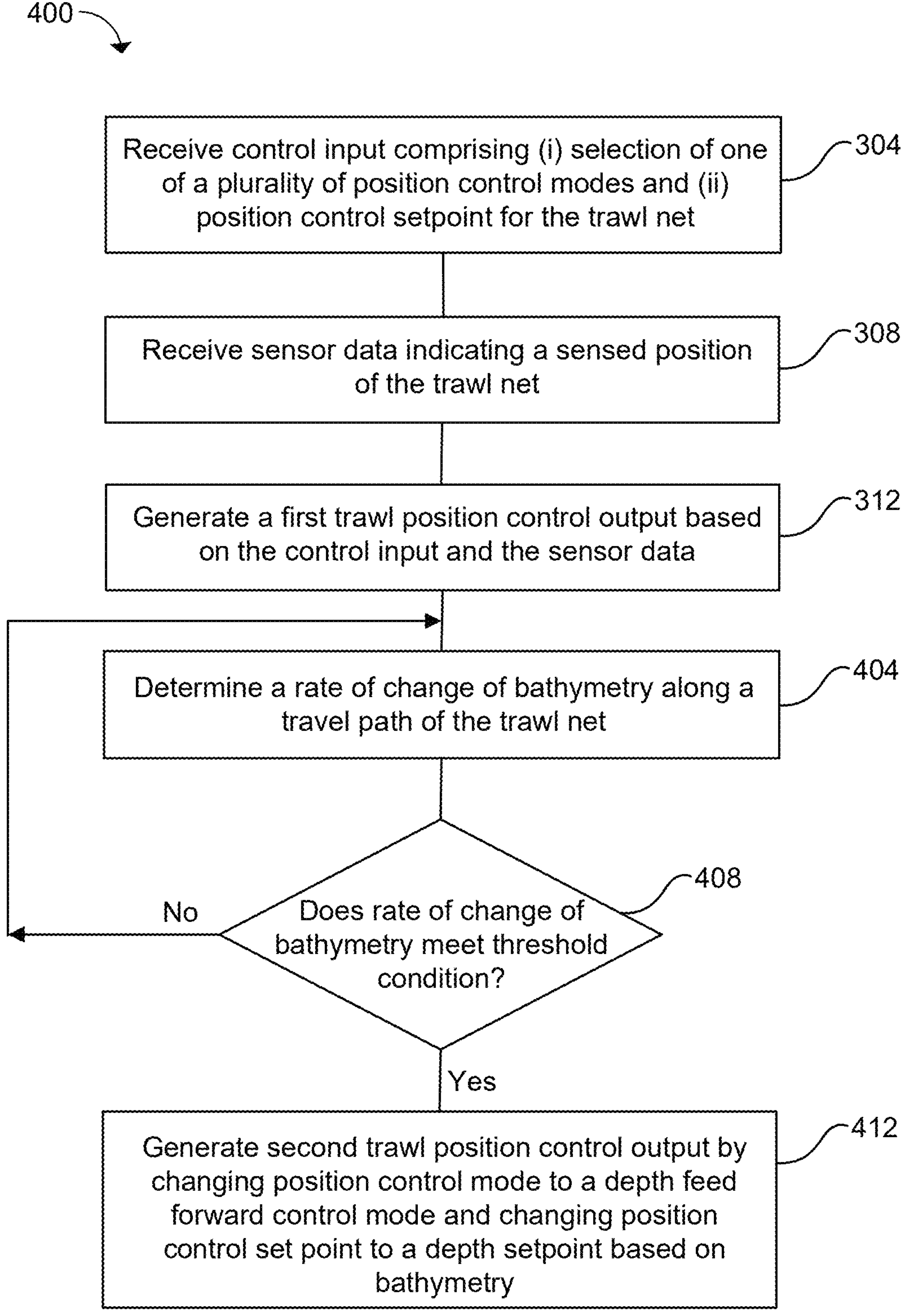
FIG. 4 is a flowchart illustrating another example method of controlling position of a trawl net.

Referring now to FIG. 4, shown therein is a flowchart illustrating an example method 400 of controlling position of a trawl net. Method 400 may be performed, for example, using position control system 100 to control position of trawl net 12, and concurrent reference is made in the description below to FIGS. 1 and 2.

Method 400 may be executed for position control of trawl net 12 during various trawling operations including, for example, bottom trawling, midwater trawling or hybrid trawling. Method 400 may be executed to respond to a rapidly changing bathymetry 36 while performing semi-autonomous or autonomous control of trawl net 12. The rapidly changing bathymetry 36 may be, for example, due to an upcoming obstacle located at bottom 28 along travel path 14. Method 400 can enable trawl net 12 to be adjusted to the rapidly changing bathymetry and avoid contact with the obstacle. Avoiding contact with the obstacle can reduce drag thereby improving fuel consumption, reduce ecosystem damage and/or reduce ghost gear issues.

Acts 304, 308 and 312 of method 400 may be identical to corresponding acts 304, 308, and 312 of method 300. At act 304, a processor may receive a control input that includes: (i) a selection of one of a plurality of position control modes, and (ii) a position control setpoint for the trawl net. At act 308, the processor may receive sensor data indicating a sensed position of the trawl net. At act 312, the processor may generate a first trawl position control output based on the control input and the sensor data.

At act 404, the processor may determine a rate of change of bathymetry along a travel path of the trawl net. For example, processor 228 may determine the rate of change of bathymetry based on sensor data received at act 308. The received sensor data may include, for example, vessel speed data and data from echosounder 48*b* indicating the sensed bathymetry. Processor 228 may determine the rate of change of bathymetry based on the vessel speed data and the sensed bathymetry.

In some embodiments, a portion or all of the bathymetric data used to determine the rate of change of bathymetry can be predicted bathymetric data. Processor 228 may generate the predicted bathymetric data based on the vessel position data (e.g., vessel latitude and longitude data from GPS sensor 48*a*) and bathymetry chart data indicating bathymetry corresponding to the vessel position. The bathymetry chart data may be, for example, stored in memory (e.g., memory 208, secondary storage device 224) or retrieved from an external server.

At act 408, the processor may determine if the rate of change of bathymetry meets a threshold condition. The threshold condition may be based on the maximum rate of change of bathymetry that the trawl net can successfully respond to. For example, the threshold condition may be based on how quickly trawl net 12 can be raised to avoid contact with an obstacle along travel path 14.

As an example, for a maximum pay-in rate of 1.26 m/s (determined based on sensor measurements, e.g., sensor data from a tow cable metering device) and an assumed tow angle of 30 degrees, the vertical pay-in velocity may be determined according to the following equation:

Vertical Velocity=1.26*sin(30 degrees)=0.63 m/s

Assuming that echosounder data indicating the bathymetry is received every 5 seconds and the control system is operating at a 10 Hz frequency, the threshold condition may be determined according to the following equation:

Threshold=0.63*50 timesteps=3.15 m/5 seconds=0.63 m/s

In some embodiments, a safety factor may be added to the threshold condition to account for any inaccuracies in the underlying assumptions and enable reliable obstacle avoidance. For example, the threshold condition may be determined according to the following equation:

Threshold=0.63*safety factor

In some embodiments, the threshold condition may be pre-determined. For example, the threshold condition may be received from an operator of vessel 16. In some embodiments, processor 228 may determine the threshold condition. For example, processor 228 may dynamically determine the threshold condition as function of the vessel speed (associated with available lead time for response) and a maximum pay-in rate of tow lines 18.

If the threshold condition is not met, the processor may continue to determine the rate of change of bathymetry as trawl net 12 is towed along travel path 14.

In response to the rate of change of bathymetry meeting the threshold condition, at act 412, the processor may generate a second trawl position control output. In some embodiments, the processor may generate the second trawl position control output by changing the position control mode (from the position control mode included in the control input received at act 304) to a depth feed forward control mode and changing the position control set point (from the position control setpoint included in the control input received at act 304) to a new depth setpoint based on bathymetry.

In some embodiments, method 400 may further include the processor adding a delay time period between detection of the rate of change of bathymetry meeting the threshold condition and generating the second trawl position control output. The processor may determine the delay time period based on the vessel speed, the maximum trawl net pay-in rate and a difference between a current position of the trawl net and a target position of the trawl net (the new depth setpoint based on bathymetry). The determined delay time period can indicate the available lead time before moving the trawl net to the target position (the new depth setpoint based on bathymetry) has to begin (e.g., in response to an upcoming obstacle along travel path 14).

As an example, for received payout rate values of 1 m/s (port side winch) and 1.2 m/s (starboard winch), vessel speed over ground (SOG) of 1.5444 m/s, assumed tow angle of 15.6 degrees (3.72:1 tow ratio), and a measured/predicted trawl net depth position value of 100 m, the following equations describe determination of the delay time period:

$$\text{Average horizontal cable velocity } (V) = [(1*\cos(15.6)) + (1.2*\cos(15.6))]/2 = 1.059 \text{ m/s}$$

$$\text{Total horizontal velocity } (Vt) = V + SOG = 1.059 + 1.5444 = 2.6 \text{ m/s}$$

$$leadtime = \text{Depth}*\text{Tow Angle}/Vt = 100*3.72/2.6 = 143 \text{ seconds}$$

Assuming a measured bathymetry value of 80 m and a trawl net altitude setpoint of 10 m, $$\text{New Depth setpoint } (DSP) = 80 - 10 = 70 \text{ m}$$

$$\text{Obstacle height } (H) = 100 - DSP = 30 \text{ m}$$

$$\text{Maximum vertical velocity } (Vy) = 1.26*\sin(15.6 = 0.339 \text{ m/s})$$

$$\text{Time required to clear obstacle } (tc) = H/Vy = 30/0.339 = 88.5 \text{ seconds}$$

$$\text{Delay} = leadtime - tc$$

$$\text{Delay} = 143 - 88.5 = 54.5 \text{ seconds}$$

In the above example, a delay time period of 54.5 seconds can be used because the available lead time is 143 seconds and the time required to pay-in the trawl net is 88.5 seconds.

In some embodiments, a safety factor may be added to the delay time period to account for any inaccuracies in the underlying assumptions and enable reliable obstacle avoidance. For example, the delay time period may be determined according to the following equation:

$$\text{Delay} = 54.5 \text{ seconds}*\text{safety factor}$$

The delay time period can enable position control system 100 to maintain trawl net position using the position control mode and position control setpoint included in the control input for as long as possible before moving the trawl net to the target position has to begin (to successfully respond to the obstacle).

As a first example execution of method 400, a received control input may include an altitude control mode selection and an associated trawl net altitude setpoint. Processor 228 may generate a first trawl position control output based on the received control input and sensor data to control trawl net altitude 26 at the trawl net altitude setpoint. However, an obstacle along travel path 14 may cause the rate of change of bathymetry to meet the threshold condition. In response, processor 228 may determine a new depth setpoint corresponding to a trawl net altitude that is equal to the height of the obstacle (above bottom 28) added to the trawl net altitude setpoint. This can enable position control system 100 to raise trawl net 12 by a sufficient amount to overcome the obstacle. Processor 228 may further change the position control mode from the altitude control mode to a depth feed forward control mode. In the depth feed forward control mode, processor 228 may generate the second trawl position control output to actuate winches 40 to pay-in tow lines 18 at the maximum pay-in rate until the new depth setpoint is achieved.

In some embodiments, method 400 may further include generating a third trawl position control output. After the new depth setpoint is achieved, the winches may no longer be required to continue paying-in the tow lines at the maximum pay-in rate. In response to the new depth setpoint being achieved, the processor may generate a third trawl position control output by changing the position control mode from the depth feed forward control mode to the depth control mode. The depth control mode may operate as described herein above with reference to the first trawl position control output (generated at act 312), except the depth set point is maintained at the new depth setpoint based on bathymetry (instead of the depth setpoint included in the control input received at act 304). This can enable the trawl net position to be controlled at a position above the obstacle.

As a second example execution of method 400, a received control input may include a depth control mode selection and an associated trawl net depth setpoint. Processor 228 may generate a first trawl position control output based on the received control input and sensor data to control trawl net depth 22 at the trawl net depth setpoint. However, an obstacle along travel path 14 may cause the rate of change of bathymetry to meet the threshold condition. In response, processor 228 may determine a new depth setpoint that provides a sufficient clearance above the obstacle. The clearance may be predefined (e.g., stored in memory 208) or may be received as an input (e.g., from an operator of vessel 16). Processor 228 may further change the position control mode from the depth control mode to a depth feed forward control mode. In the depth feed forward control mode, processor 228 may generate the second trawl position control output to actuate winches 40 to pay-in tow lines 18 at the maximum pay-in rate until the new depth setpoint is achieved.

As described above with reference to the first example execution of method 400, in response to the new depth setpoint being achieved, the processor may generate a third trawl position control output by changing the position control mode from the depth feed forward control mode to the depth control mode. The depth set point for the depth control mode may be maintained at the new depth setpoint (based on the clearance above the obstacle). This can enable the trawl net position to be controlled at a position above the obstacle.

In some embodiments, method 400 may further include generating a fourth trawl position control output. After the obstacle has been passed by the trawl net, position control system 100 may return to controlling position of the trawl net based on the control input received at act 304, i.e., the position control mode selection and the position control setpoint included in the received control input.

As a first example, the processor may generate the fourth trawl position control output in response to a time duration of the third trawl position control output exceeding a threshold time duration (i.e. the trawl net position has been controlled above the obstacle for a time greater than the threshold time duration). The processor may determine the threshold time duration to be sufficiently large to pass any obstacles along travel path 14 based on the vessel speed and the trawl net apparatus being controlled. In some embodiments, the threshold time duration may be a predetermined time duration, for example, stored in memory 208. In some embodiments, the threshold time duration may be received as an input by position control system 100 (e.g., from an operator of vessel 16).

As a second example, the processor may use multiple conditions and generate the fourth trawl position control output in response to any one of the multiple conditions being met. For example, a first condition may include the threshold time duration as described herein above with reference to the first example. The second condition may include a combination of a minimum time duration of the third trawl position control output (that is shorter than the threshold time duration of the first condition) and the trawl net altitude 26 being within a threshold distance of the trawl net altitude setpoint. The second condition may only be met when the third trawl position control output has exceeded the minimum time duration (indicating that the trawl net position has been controlled above the obstacle for a time greater than the minimum time duration) and the trawl net altitude 26 is within a threshold distance of the trawl net altitude setpoint (thereby indicating that the obstacle has been passed).

Figure 5:
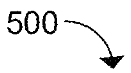
FIG. 5 is a flowchart illustrating another example method of controlling position of a trawl net.
Figure 5:
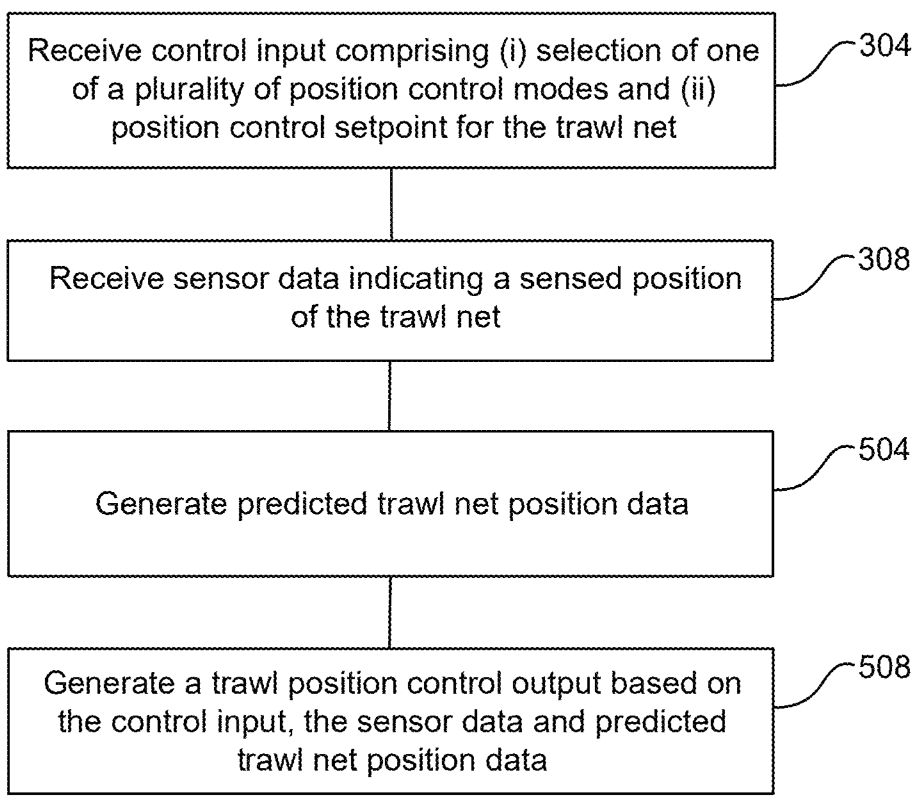

Referring now to FIG. 5, shown therein is a flowchart illustrating an example method 500 of controlling position of a trawl net. Method 500 may be performed, for example, using position control system 100 to control position of trawl net 12, and concurrent reference is made in the description below to FIGS. 1 and 2.

Method 500 may be executed for semi-autonomous or autonomous control of trawl net 12. Method 300 can enable position control of trawl net 12 during various trawling operations including, for example, midwater trawling or hybrid trawling.

Method 500 includes generating predicted trawl net position data. The predicted trawl net position data can enable improvement in the performance of position control system 100 by augmenting received sensor data. For example, the frequency of the received sensor data may be lower than a target frequency for generation of control signals. The predicted trawl net position data can be generated at a higher frequency compared with the sensor data and can enable the generation of control signals at the target frequency. As another example, the sensor data may be interrupted and may not be available for some time intervals. Predicted trawl net position data can be generated for such time intervals where the sensor data is missing. As other examples, the predicted trawl net position data can be used to augment received sensor data when the received sensor data fails a data validation test and/or includes other data issues (e.g., stale/outlier data).

Acts 304 and 308 of method 500 may be identical to corresponding acts 304 and 308 of method 300. At act 304, a processor may receive a control input that includes: (i) a selection of one of a plurality of position control modes, and (ii) a position control setpoint for the trawl net. At act 308, the processor may receive sensor data indicating a sensed position of the trawl net.

At act 504, the processor may generate predicted trawl net position data. The predicted trawl net position data may include predicted trawl net layback data and predicted trawl net depth data. The processor may generate the predicted trawl net position data using any suitable method. For example, the processor may use one or more machine learning models, statistical models and/or deterministic models to generate the predicted trawl net position data. In some embodiments, different models may be used in different applications based on factors including accuracy requirements, computing resource availability, and/or statistical/training data availability.

In a first example method of generating predicted trawl net position data, the processor may input received sensor data and control input into the one or more machine learning models trained to generate predicted trawl net position data.

In a second example method of generating predicted trawl net position data, the processor may use a deterministic model to generate predicted trawl net position data. The processor may define a plurality of parameters that each describe at least one property associated with the trawl net. The parameters may include a trawl net gear weight, a trawl net characteristic area, a tow line linear density, a tow line modulus of elasticity, and/or a trawl net environment saltwater density. The processor may define the parameters based on, for example, stored data (e.g., stored in memory 208) or received data (e.g., from an operator of vessel 16, from an external server, etc.).

The processor may further receive input data including sensor data and a candidate drag coefficient value for the trawl net. The sensor data may include, for example, vessel speed data and tow line payout data. The candidate drag coefficient value may be received from, for example, an operator of vessel 16, memory 208, etc.

The processor may use a classical formula for drag force calculation to determine the tow angle by iteratively determining line drag values for multiple candidate tow angle values based on the defined parameters and the input data. The velocity components of the trawl net may be determined based on the candidate tow angle value and trigonometry, and a drag force per unit length of the tow line may be determined using the candidate tow angle value and the tow line properties. In some embodiments, an initial candidate tow angle value of 30° may be used because trawlers may often tow at a 2.5:1 tow line payout versus depth ratio. The processor can determine predicted trawl net depth and layback based on the determined tow angle 32 and the tow line payout length.

In some embodiments, the processor may improve the accuracy of the predicted trawl net depth and layback by determining a tow line catenary and using the tow line catenary to generate the predicted trawl net depth and layback. The processor may determine the tow line catenary by determining tow line elongation caused by the drag force and weight of the trawl net.

In some embodiments, the processor may improve the accuracy of the predicted trawl net depth and layback by iteratively changing the candidate drag coefficient value to generate predicted trawl net positions and comparing the predicted trawl net positions with sensed or measured trawl net positions. The processor may determine the drag coefficient by iteratively change the candidate drag coefficient value until a difference between the sensed trawl net positions and corresponding predicted trawl net positions meets a threshold condition (e.g., a threshold accuracy level). The predicted trawl net position data corresponding to the determined drag coefficient can enable higher accuracy compared with the predicted trawl net position data corresponding to the initial candidate drag coefficient value.

In some embodiments, the predicted trawl net position data may further include predicted trawl net altitude data. The predicted trawl net altitude data may be generated based on the predicted trawl net layback data, the predicted trawl net depth data and corresponding bathymetry. For example, the processor may determine the bathymetry at a given vessel location based on sensed bathymetric data (e.g., echosounder data) or predicted bathymetric data (e.g., using bathymetry chart data for a vessel location based on GPS data). Further, the processor may determine a relative position of the trawl net with reference to the vessel based on the trawl net layback and determine the bathymetry corresponding to the trawl net location. The processor may further generate the predicted trawl net altitude based on the trawl net depth and the corresponding bathymetry.

At act 508, the processor may generate a trawl position control output based on the control input, the sensor data and predicted trawl net position data. The processor may generate the trawl position control output similar to as described herein above with reference to act 312 of method 300 (FIG. 3), with the difference being that the sensor data is augmented with the predicted trawl net position data. Accordingly, for any given time instance, position control system 100 can generate the trawl position control output based on a difference between a setpoint (e.g., a trawl net depth setpoint) and either one of a corresponding measured or predicted value (e.g., a measured trawl net depth or a predicted trawl net depth).

Figure 6:
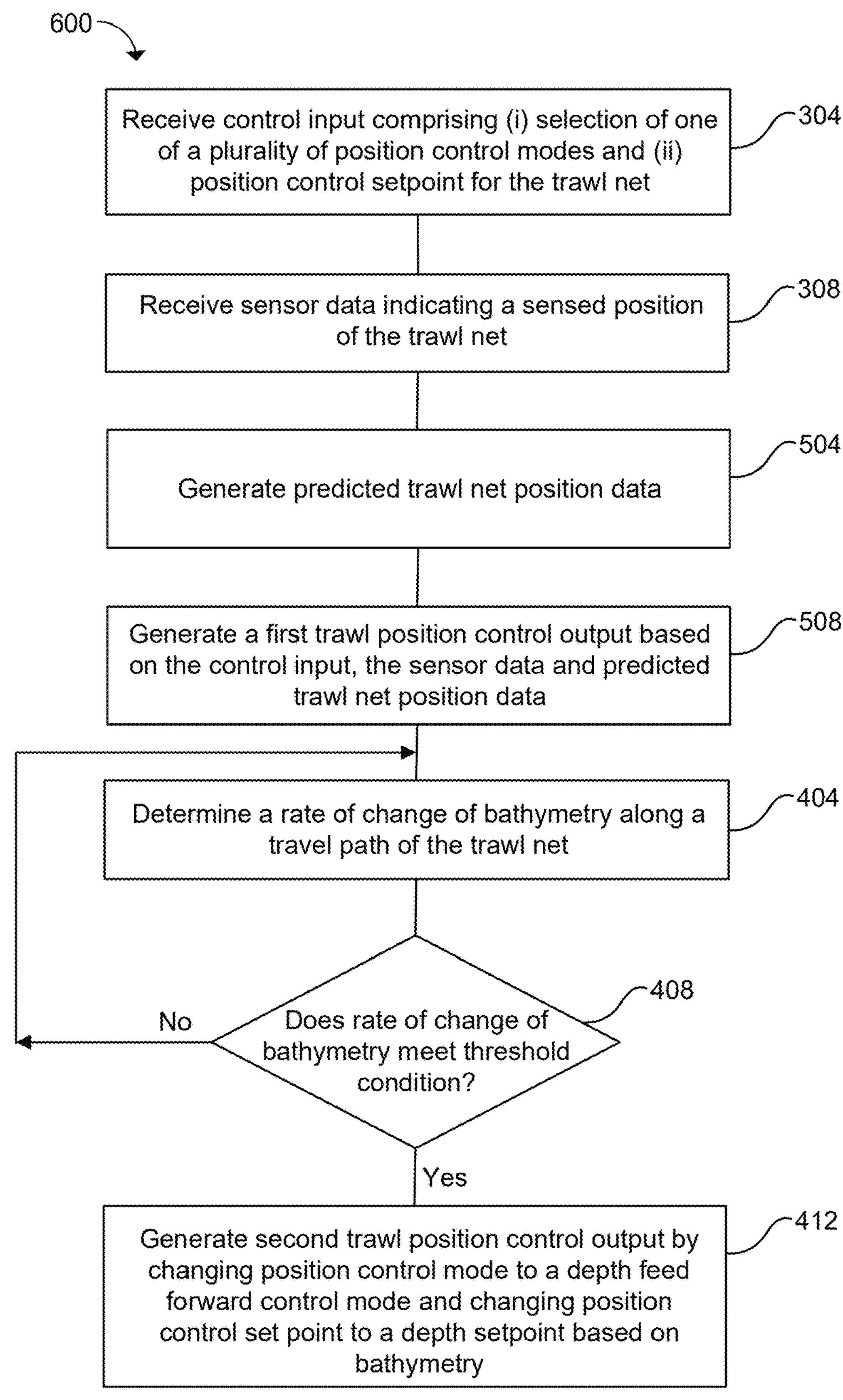
FIG. 6 is a flowchart illustrating another example method of controlling position of a trawl net.

Referring now to FIG. 6, shown therein is a flowchart illustrating an example method 600 of controlling position of a trawl net. Method 600 may be performed, for example, using position control system 100 to control position of trawl net 12, and concurrent reference is made in the description below to FIGS. 1 and 2.

Method 600 may be executed for position control of trawl net 12 during various trawling operations including, for example, bottom trawling, midwater trawling or hybrid trawling. Method 600 may be executed to respond to a rapidly changing bathymetry 36 while performing semi-autonomous or autonomous control of trawl net 12. The rapidly changing bathymetry 36 may be, for example, due to an upcoming obstacle located at bottom 28 along travel path 14. Method 600 can enable trawl net 12 to be adjusted to the rapidly changing bathymetry and avoid contact with the obstacle. Avoiding contact with the obstacle can reduce drag thereby improving fuel consumption, reduce ecosystem damage and/or reduce ghost gear issues.

Additionally, method 600 includes generating predicted trawl net position data. The predicted trawl net position data can enable improvement in the performance of position control system 100 by augmenting received sensor data.

Acts 304, 308, 504 and 508 of method 600 may be identical to corresponding acts 304, 308, 504 and 508 of method 500. At act 304, a processor may receive a control input that includes: (i) a selection of one of a plurality of position control modes, and (ii) a position control setpoint for the trawl net. At act 308, the processor may receive sensor data indicating a sensed position of the trawl net. At act 504, the processor may generate predicted trawl net position data. At act 508, the processor may generate a first trawl position control output based on the control input, the sensor data and predicted trawl net position data.

Acts 404, 408 and 412 of method 600 may be identical to corresponding acts 404, 408, and 412 of method 400. At act 404, the processor may determine a rate of change of bathymetry along a travel path of the trawl net. At act 408, the processor may determine if the rate of change of bathymetry meets a threshold condition. In response to the rate of change of bathymetry meeting the threshold condition, at act 412, the processor may generate a second trawl position control output. In some embodiments, the processor may generate the second trawl position control output by changing the position control mode (from the position control mode included in the control input received at act 304) to a depth feed forward control mode and changing the position control set point (from the position control setpoint included in the control input received at act 304) to a new depth setpoint based on bathymetry.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting and it will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

ITEMS

Item 1: A method of controlling position of a trawl net, the method comprising: receiving, by a processor, a control input, wherein the control input comprises: (i) a selection of one of a plurality of position control modes, and (ii) a position control setpoint for the trawl net; receiving, by the processor, sensor data indicating a sensed position of the trawl net; generating, by the processor, a first trawl position control output based on the control input and the sensor data; determining, by the processor, a rate of change of bathymetry along a travel path of the trawl net; and in response to the rate of change of bathymetry meeting a threshold condition, generating a second trawl position control output by: changing the one of the plurality of position control modes to another of the plurality of position control modes, wherein the other of the plurality of control modes is a depth feed forward control mode, and changing the position control set point to a depth setpoint based on bathymetry.

Item 2: The method of any preceding item, wherein the plurality of position control modes comprises a depth control mode, the method further comprising generating a third trawl position control output by changing the depth feed forward control mode to the depth control mode in response to the sensed position of the trawl net matching the depth setpoint.

Item 3: The method of any preceding item further comprising generating a fourth trawl position control output, in response to a time duration of the third trawl position control output exceeding a threshold time duration, by: using the selected one of the plurality of position control modes provided in the control input; and changing the position control set point from the depth setpoint to the position control setpoint provided in the control input.

Item 4: The method of any preceding item further comprising generating a fourth trawl position control output, in response to: i) a time duration of the third trawl position control output exceeding a threshold time duration, and ii) a sensed position of the trawl net meeting a threshold position level, wherein the fourth trawl position control output is generated by: using the selected one of the plurality of position control modes provided in the control input; and changing the position control set point from the depth setpoint to the position control setpoint provided in the control input.

Item 5: The method of any preceding item, wherein the processor determines the threshold condition based on a vessel speed and a maximum trawl net pay-in rate.

Item 6: The method of any preceding item further comprising the processor adding a delay time period between detection of the rate of change of bathymetry meeting the threshold condition and generating the second trawl position control output.

Item 7: The method of any preceding item, wherein the processor determines the delay time period based on one or more of a vessel speed, a maximum trawl net pay-in rate and the sensed position of the trawl net.

Item 8: A position control system for a trawl net movable along a travel path, the system comprising: a memory storing processor-executable instructions; and at least one processor communicatively coupled with the memory, the at least one processor configured by the instructions to collectively: receive a control input, wherein the control input comprises: (i) a selection of one of a plurality of position control modes, and (ii) a position control setpoint for the trawl net; receive sensor data indicating a sensed position of the trawl net; generate a first trawl position control output based on the control input and the sensor data; determine a rate of change of bathymetry along the travel path of the trawl net; and in response to the rate of change of bathymetry meeting a threshold condition, generate a second trawl position control output by: changing the one of the plurality of position control modes to another of the plurality of position control modes, wherein the other of the plurality of control modes is a depth feed forward control mode, and changing the position control set point to a depth setpoint based on bathymetry.

Item 9: The position control system of any preceding item, wherein the plurality of position control modes comprises a depth control mode, the at least one processor being further configured by the instructions to collectively generate a third trawl position control output by changing the depth feed forward control mode to the depth control mode in response to the sensed position of the trawl net matching the depth setpoint.

Item 10: The position control system of any preceding item, wherein the at least one processor is further configured by the instructions to collectively generate a fourth trawl position control output, in response to a time duration of the third trawl position control output exceeding a threshold time duration, by: using the selected one of the plurality of position control modes provided in the control input; and changing the position control set point from the depth setpoint to the position control setpoint provided in the control input.

Item 11: The position control system of any preceding item, wherein the at least one processor is further configured by the instructions to collectively generate a fourth trawl position control output, in response to: i) a time duration of the third trawl position control output exceeding a threshold time duration, and ii) a sensed position of the trawl net meeting a threshold position level, wherein the fourth trawl position control output is generated by: using the selected one of the plurality of position control modes provided in the control input; and changing the position control set point from the depth setpoint to the position control setpoint provided in the control input.

Item 12: The position control system of any preceding item, wherein the at least one processor is further configured by the instructions to collectively determine the threshold condition based on a vessel speed and a maximum trawl net pay-in rate.

Item 13: The position control system of any preceding item, wherein the at least one processor is further configured by the instructions to collectively add a delay time period between detection of the rate of change of bathymetry meeting the threshold condition and generating the second trawl position control output.

Item 14: The position control system of any preceding item, wherein the at least one processor is further configured by the instructions to collectively determine the delay time period based on one or more of a vessel speed, a maximum trawl net pay-in rate and the sensed position of the trawl net.

Item 15: A non-transitory computer-readable medium comprising instructions executable by a processor, wherein the instructions when executed configure the processor to: receive a control input, wherein the control input comprises: (i) a selection of one of a plurality of position control modes, and (ii) a position control setpoint for the trawl net; receive sensor data indicating a sensed position of a trawl net; generate a first trawl position control output based on the control input and the sensor data; determine a rate of change of bathymetry along a travel path of the trawl net; and in response to the rate of change of bathymetry meeting a threshold condition, generate a second trawl position control output by: changing the one of the plurality of position control modes to another of the plurality of position control modes, wherein the other of the plurality of control modes is a depth feed forward control mode, and changing the position control set point to a depth setpoint based on bathymetry.

Item 16: The non-transitory computer-readable medium of any preceding item, wherein the plurality of position control modes comprises a depth control mode, the instructions when executed further configure the processor to generate a third trawl position control output by changing the depth feed forward control mode to the depth control mode in response to the sensed position of the trawl net matching the depth setpoint.

Item 17: The non-transitory computer-readable medium of any preceding item, wherein the instructions when executed further configure the processor to generate a fourth trawl position control output, in response to a time duration of the third trawl position control output exceeding a threshold time duration, by: using the selected one of the plurality of position control modes provided in the control input; and changing the position control set point from the depth setpoint to the position control setpoint provided in the control input.

Item 18: The non-transitory computer-readable medium of any preceding item, wherein the instructions when executed further configure the processor to generate a fourth trawl position control output, in response to: i) a time duration of the third trawl position control output exceeding a threshold time duration, and ii) a sensed position of the trawl net meeting a threshold position level, wherein the fourth trawl position control output is generated by: using the selected one of the plurality of position control modes provided in the control input; and changing the position control set point from the depth setpoint to the position control setpoint provided in the control input.

Item 19: The non-transitory computer-readable medium of any preceding item, wherein the instructions when executed further configure the processor to determine the threshold condition based on a vessel speed and a maximum trawl net pay-in rate.

Item 20: The non-transitory computer-readable medium of any preceding item, wherein the instructions when executed further configure the processor to add a delay time period between detection of the rate of change of bathymetry meeting the threshold condition and generating the second trawl position control output.

Item 21: The non-transitory computer-readable medium of any preceding item, wherein the instructions when executed further configure the processor to determine the delay time period based on one or more of a vessel speed, a maximum trawl net pay-in rate and the sensed position of the trawl net.

We claim:

1. A method of controlling position of a trawl net, the method comprising:

receiving, by a processor, a control input, wherein the control input comprises: (i) a selection of one of a plurality of position control modes, and (ii) a position control setpoint for the trawl net;

receiving, by the processor, sensor data indicating a sensed position of the trawl net;

generating, by the processor, a first trawl position control output based on the control input and the sensor data;

determining, by the processor, a rate of change of bathymetry along a travel path of the trawl net;

determining, by the processor, a threshold condition based on a vessel speed and a maximum trawl net pay-in rate; and in response to the rate of change of bathymetry meeting the threshold condition, generating a second trawl position control output by:

changing the one of the plurality of position control modes to another of the plurality of position control modes, wherein the other of the plurality of control modes is a depth feed forward control mode, and changing the position control set point to a depth setpoint based on bathymetry.

2. The method of claim 1, wherein the plurality of position control modes comprises a depth control mode, the method further comprising generating a third trawl position control output by changing the depth feed forward control mode to the depth control mode in response to the sensed position of the trawl net matching the depth setpoint.

3. The method of claim 2 further comprising generating a fourth trawl position control output, in response to a time duration of the third trawl position control output exceeding a threshold time duration, by:

using the selected one of the plurality of position control modes provided in the control input; and changing the position control set point from the depth setpoint to the position control setpoint provided in the control input.

4. The method of claim 2 further comprising generating a fourth trawl position control output, in response to: i) a time duration of the third trawl position control output exceeding a threshold time duration, and ii) a sensed position of the trawl net meeting a threshold position level, wherein the fourth trawl position control output is generated by:

using the selected one of the plurality of position control modes provided in the control input; and changing the position control set point from the depth setpoint to the position control setpoint provided in the control input.

5. The method of claim 1 further comprising the processor adding a delay time period between detection of the rate of change of bathymetry meeting the threshold condition and generating the second trawl position control output.

6. The method of claim 5, wherein the processor determines the delay time period based on one or more of the vessel speed, the maximum trawl net pay-in rate and the sensed position of the trawl net.

7. A position control system for a trawl net movable along a travel path, the system comprising:

a memory storing processor-executable instructions; and at least one processor communicatively coupled with the memory, the at least one processor configured by the instructions to collectively:

receive a control input, wherein the control input comprises: (i) a selection of one of a plurality of position control modes, and (ii) a position control setpoint for the trawl net;

receive sensor data indicating a sensed position of the trawl net;

generate a first trawl position control output based on the control input and the sensor data;

determine a rate of change of bathymetry along the travel path of the trawl net;

determine a threshold condition based on a vessel speed and a maximum trawl net pay-in rate; and in response to the rate of change of bathymetry meeting the threshold condition, generate a second trawl position control output by:

changing the one of the plurality of position control modes to another of the plurality of position control modes, wherein the other of the plurality of control modes is a depth feed forward control mode, and changing the position control set point to a depth setpoint based on bathymetry.

8. The position control system of claim 7, wherein the plurality of position control modes comprises a depth control mode, the at least one processor being further configured by the instructions to collectively generate a third trawl position control output by changing the depth feed forward control mode to the depth control mode in response to the sensed position of the trawl net matching the depth setpoint.

9. The position control system of claim 8, wherein the at least one processor is further configured by the instructions to collectively generate a fourth trawl position control output, in response to a time duration of the third trawl position control output exceeding a threshold time duration, by:

using the selected one of the plurality of position control modes provided in the control input; and changing the position control set point from the depth setpoint to the position control setpoint provided in the control input.

10. The position control system of claim 8, wherein the at least one processor is further configured by the instructions to collectively generate a fourth trawl position control output, in response to: i) a time duration of the third trawl position control output exceeding a threshold time duration, and ii) a sensed position of the trawl net meeting a threshold position level, wherein the fourth trawl position control output is generated by:

using the selected one of the plurality of position control modes provided in the control input; and changing the position control set point from the depth setpoint to the position control setpoint provided in the control input.

11. The position control system of claim 7, wherein the at least one processor is further configured by the instructions to collectively add a delay time period between detection of the rate of change of bathymetry meeting the threshold condition and generating the second trawl position control output.

12. The position control system of claim 11, wherein the at least one processor is further configured by the instructions to collectively determine the delay time period based on one or more of the vessel speed, the maximum trawl net pay-in rate and the sensed position of the trawl net.

13. A non-transitory computer-readable medium comprising instructions executable by a processor, wherein the instructions when executed configure the processor to:

receive a control input, wherein the control input comprises: (i) a selection of one of a plurality of position control modes, and (ii) a position control setpoint for the trawl net;

receive sensor data indicating a sensed position of a trawl net;

generate a first trawl position control output based on the control input and the sensor data;

determine a rate of change of bathymetry along a travel path of the trawl net;

determine a threshold condition based on a vessel speed and a maximum trawl net pay-in rate; and in response to the rate of change of bathymetry meeting the threshold condition, generate a second trawl position control output by:

changing the one of the plurality of position control modes to another of the plurality of position control modes, wherein the other of the plurality of control modes is a depth feed forward control mode, and changing the position control set point to a depth setpoint based on bathymetry.

14. The non-transitory computer-readable medium of claim 13, wherein the plurality of position control modes comprises a depth control mode, the instructions when executed further configure the processor to generate a third trawl position control output by changing the depth feed forward control mode to the depth control mode in response to the sensed position of the trawl net matching the depth setpoint.

15. The non-transitory computer-readable medium of claim 14, wherein the instructions when executed further configure the processor to generate a fourth trawl position control output, in response to a time duration of the third trawl position control output exceeding a threshold time duration, by:

using the selected one of the plurality of position control modes provided in the control input; and changing the position control set point from the depth setpoint to the position control setpoint provided in the control input.

16. The non-transitory computer-readable medium of claim 14, wherein the instructions when executed further configure the processor to generate a fourth trawl position control output, in response to: i) a time duration of the third trawl position control output exceeding a threshold time duration, and ii) a sensed position of the trawl net meeting a threshold position level, wherein the fourth trawl position control output is generated by:

using the selected one of the plurality of position control modes provided in the control input; and changing the position control set point from the depth setpoint to the position control setpoint provided in the control input.

17. The non-transitory computer-readable medium of claim 13, wherein the instructions when executed further configure the processor to add a delay time period between detection of the rate of change of bathymetry meeting the threshold condition and generating the second trawl position control output.

18. The non-transitory computer-readable medium of claim 17, wherein the instructions when executed further configure the processor to determine the delay time period based on one or more of the vessel speed, the maximum trawl net pay-in rate and the sensed position of the trawl net.

* * * * *